United States Patent
Coretto et al.

(10) Patent No.: US 12,398,682 B1
(45) Date of Patent: Aug. 26, 2025

(54) DIRECT CONTROL VARIABLE DISPLACEMENT PUMP WITH DUAL-FUNCTION HIGH-PRESSURE RELIEF VALVE- PRESSURE REGULATING VALVE

(71) Applicant: Hamilton Sundstrand Corporation, Charlotte, NC (US)

(72) Inventors: August M. Coretto, Windsor, CT (US); Ryan Prescott Susca, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1 day.

(21) Appl. No.: 18/589,583

(22) Filed: Feb. 28, 2024

(51) Int. Cl.
| | |
|---|---|
| *F02C 9/30* | (2006.01) |
| *F02C 7/232* | (2006.01) |
| *F02C 7/236* | (2006.01) |
| *F04B 1/063* | (2020.01) |
| *F04B 9/105* | (2006.01) |
| *F04B 9/109* | (2006.01) |
| *F04B 49/035* | (2006.01) |
| *F04B 49/12* | (2006.01) |
| *F04B 49/24* | (2006.01) |

(52) U.S. Cl.
CPC .............. *F02C 9/30* (2013.01); *F04B 49/12* (2013.01); *F04B 49/24* (2013.01); *F02C 7/232* (2013.01); *F02C 7/236* (2013.01); *F04B 1/063* (2013.01); *F04B 9/1056* (2013.01); *F04B 9/109* (2013.01); *F04B 49/035* (2013.01); *F04B 49/126* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,024,797 | A | * | 5/1977 | Johnson ............... B62D 11/183 137/112 |
| 7,770,388 | B2 | | 8/2010 | Desai |
| 8,128,378 | B2 | | 3/2012 | Rowan et al. |
| 8,408,233 | B2 | | 4/2013 | Reuter et al. |
| 8,529,221 | B2 | | 9/2013 | Futa, Jr. et al. |
| 8,720,482 | B2 | | 5/2014 | Griffiths |
| 11,674,455 | B2 | | 6/2023 | Rutar |
| 11,788,476 | B1 | | 10/2023 | Rowan et al. |
| 2010/0242431 | A1 | * | 9/2010 | Baker ..................... F02C 7/232 417/278 |

(Continued)

*Primary Examiner* — Binh Q Tran
(74) *Attorney, Agent, or Firm* — CANTOR COLBURN LLP (57) ABSTRACT

A dual-function high-pressure relief valve pressure regulating valve includes valve sleeve, a spool that slides laterally in a first direction and a second direction, and a piston disposed against the valve sleeve. The valve sleeve includes a PRV inlet window, a PRV outlet window, and a pressure relief outlet window. The spool includes a PRV inlet landing, and a combined PRV/HPRV landing. The piston is configured to slide laterally in the first direction and the second direction based on a pressing force applied by the spool. The dual-function HPRV-PRV operates in a first mode to adjust the spool and maintain opening of the PRV inlet window and the PRV outlet window while closing the pressure relief outlet window, and operates in a second mode to adjust both the spool and the piston to open each of the PRV inlet window, the PRV outlet window, and the pressure relief outlet window.

20 Claims, 5 Drawing Sheets

(56) References Cited

U.S. PATENT DOCUMENTS

| | | | |
|---|---|---|---|
| 2011/0173964 A1* | 7/2011 | Takahashi | E02F 9/2232 |
| | | | 60/451 |
| 2012/0045348 A1* | 2/2012 | Garry | F04B 23/04 |
| | | | 417/302 |
| 2016/0377017 A1* | 12/2016 | Basmaji | F02D 41/3094 |
| | | | 701/103 |
| 2018/0080507 A1* | 3/2018 | Smid | F16H 61/0025 |
| 2018/0163636 A1* | 6/2018 | Griffiths | F02C 7/222 |
| 2018/0340501 A1 | 11/2018 | Ni et al. | |
| 2022/0372941 A1 | 11/2022 | Susca et al. | |
| 2023/0034465 A1 | 2/2023 | Stoicescu | |
| 2023/0125840 A1 | 4/2023 | Rutar | |
| 2023/0167771 A1 | 6/2023 | O'Rorke et al. | |
| 2023/0204029 A1 | 6/2023 | Ni et al. | |

* cited by examiner

DIRECT CONTROL VARIABLE DISPLACEMENT PUMP WITH DUAL-FUNCTION HIGH-PRESSURE RELIEF VALVE- PRESSURE REGULATING VALVE

BACKGROUND

Exemplary embodiments of the present disclosure pertain to the art of aircraft fuel systems, and more particularly, a variable displacement pump.

The design of modern aircraft fuel systems aim to reduce gearbox horsepower extraction by the fuel system to improve overall Thrust Specific Fuel Consumption (TSFC), typically turning to variable displacement pumps (VDPs) to reduce/eliminate recirculated fuel flow. However, these VDPs sometimes face challenges in maintaining responsiveness, particularly in actuation systems that require precise and rapid adjustments in hydraulic pressure. Additionally, some VDPs struggle to consistently maintain required pressure during sudden changes in load demand, known as actuation transients, which could impact aircraft performance and safety.

BRIEF DESCRIPTION

According to a non-limiting embodiment, a pump control system comprises a direct control variable displacement pump (VDP) and a dual-function high-pressure relief valve (HPRV)-pressure regulating valve (PRV) valve. The direct control VDP includes a fluid inlet configured to receive an upstream fluid having a first pressure (P1) and a fluid outlet configured to output a downstream fluid having a second pressure (P2). The dual-function HPRV is connected in parallel with the direct control VDP. The HPRV is adjustable in a first direction and an opposing second direction when operating in a first mode to maintain an open bypass flow path while closing a front entry relief flow path, and is adjustable in the first direction to maintain the open bypass flow path is maintained and open the front entry relief flow path in response to operating in a second mode.

In addition to one or more of the features described above, or as an alternative to any of the foregoing embodiments, the dual-function HPRV-PRV regulating valve operates in the first mode to adjust the PRV spool to maintain opening of the PRV inlet window and the PRV outlet window while closing the pressure relief outlet window to enable and establish the bypass flow path, and operates in the second mode to adjust both the PRV spool and the HPRV piston to open each of the PRV inlet window, the PRV outlet window, and the pressure relief outlet window to enable and establish the front entry relieve flow path.

In addition to one or more of the features described above, or as an alternative to any of the foregoing embodiments, the HPRV piston includes an HPRV outer diameter surface and an HPRV stop surface. The HPRV outer diameter surface is slidably disposed against an inner diameter surface of the valve sleeve. The HPRV stop surface extends orthogonally from the HPRV outer diameter surface.

In addition to one or more of the features described above, or as an alternative to any of the foregoing embodiments, the inlet landing and the PRV/HPRV landing are disposed within an inner area of the valve. The PRV spool further includes a bumper extending therefrom and which is configured to apply the pressing force to the HPRV stop surface to laterally displace the HPRV piston.

In addition to one or more of the features described above, or as an alternative to any of the foregoing embodiments, the dual-function HPRV-PRV regulating valve further comprises an HPRV spring and a PRV spring. The HPRV spring has a first end coupled to the housing and an opposing end coupled to a first side of the HPRV stop surface. The PRV spring has a first end coupled to a second side of the HPRV stop surface opposite the first side and a second end coupled to the PRV spool.

In addition to one or more of the features described above, or as an alternative to any of the foregoing embodiments, the HPRV spring is sized larger than PRV spring such that the HPRV spring exerts a first spring force upon the HPRV piston that is greater than a second spring force exerted by the PRV spring.

In addition to one or more of the features described above, or as an alternative to any of the foregoing embodiments, the HPRV piston is displaced in the first direction in response to the pressing force applied by the PRV spool being greater than the first spring force exerted by the HPRV spring.

In addition to one or more of the features described above, or as an alternative to any of the foregoing embodiments, the pump control system further comprises a hydraulic actuator, an electro-hydraulic servo valve (EHSV), a position sensor, and a controller. The hydraulic actuator is configured to control displacement of the VDP based on hydraulic pressure. The EHSV is configured to provide the hydraulic pressure to the hydraulic actuator. The position sensor is configured to measure a position of the VDP and to output a position signal indicating the position of the VDP. The controller is in signal communication with the position sensor and the EHSV, and is configured to control the EHSV based at least in part on the measured position of the VDP.

In addition to one or more of the features described above, or as an alternative to any of the foregoing embodiments, the controller determines a load demand and controls the hydraulic actuator to adjust the VDP based at least in part on the load demand.

In addition to one or more of the features described above, or as an alternative to any of the foregoing embodiments, controlling the hydraulic actuator controls a hydraulic pressure provided to the VDP.

In addition to one or more of the features described above, or as an alternative to any of the foregoing embodiments, the EHSV controls the pressure and flow of hydraulic fluid provided to the hydraulic actuator based on a control signal output by the controller.

In addition to one or more of the features described above, or as an alternative to any of the foregoing embodiments, the position sensor includes a linear-variable displacement transducer.

According to another non-limiting embodiment, a dual-function high-pressure relief valve (HPRV)-pressure regulating valve (PRV) comprises a valve sleeve, a PRV spool, and a HPRV piston. The valve sleeve includes a PRV inlet window, a PRV outlet window, and a pressure relief outlet window. The PRV spool is configured to slide laterally in a first direction and an opposing second direction with respect to the valve sleeve. The PRV spool includes a PRV inlet landing, a combined PRV outlet landing and HPRV (PRV/HPRV) landing, and a chamber between the PRV inlet landing and the PRV/HPRV landing. The HPRV piston is disposed against the valve sleeve and is configured to slide laterally in the first direction and the opposing second direction based at least in part on a pressing force applied by the PRV spool. The dual-function HPRV-PRV operates in a first mode to adjust the PRV spool to maintain opening of the PRV inlet window and the PRV outlet window while closing the pressure relief outlet window, and operates in the second mode to adjust both the PRV spool and the HPRV piston to open each of the PRV inlet window, the PRV outlet window, and the pressure relief outlet window.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Variable displacement pumps play a crucial role in the fuel systems of modern aircraft, offering enhanced efficiency and adaptability under varying flight conditions. Their primary function is to regulate the flow of fuel to the engines, adjusting their displacement to align with the engine's varying fuel requirements during different flight phases, such as takeoff, cruising, and landing. This ability to adjust the fuel flow not only contributes to the efficiency of the aircraft's operation but also aids in maintaining the optimal fuel pressure. The correct pressure is vital to prevent issues like vapor lock or fuel cavitation, ensuring that the engine receives fuel at the right pressure regardless of the operational conditions.

These pumps are particularly valued for their energy efficiency, as they adapt the flow rate to the engine's immediate needs, contrasting with the less efficient fixed displacement pumps. This feature is especially important in aviation, where weight and energy consumption are critical factors. Additionally, variable displacement pumps excel in their adaptability to various flight conditions, dynamically adjusting the fuel supply in response to changes in altitude, speed, and other flying conditions, thereby ensuring the engine performs optimally throughout the flight.

Aircraft variable displacement pumps, while efficient, have certain limitations. One significant issue is their complexity and cost; these pumps are more intricate than fixed displacement pumps, leading to higher manufacturing and maintenance expenses. Another challenge is their potential lack of responsiveness, especially in actuation systems requiring rapid and precise hydraulic pressure adjustments. Additionally, some variable displacement pumps may struggle to maintain consistent pressure during quick changes in demand, known as actuation transients, potentially affecting aircraft performance and safety.

Various non-limiting embodiments of the present disclosure address the short-comings discussed above by providing a direct control variable displacement pump (VDP) having dual-function high-pressure relief valve (HPRV)-pressure regulating valve (PRV). The direct controlled dual-function VDP includes a PRV combined with a HPRV to provide a single valve that provides both PRV and HPRV functionality. The PRV operates to maintain a continuous small amount of bypass flow during steady-state (SS) operation and then to close off the bypass loop to dampen the initial pressure droop at the start of the actuation transient. As the transient ends, the PRV opens to reduce the pressure spike. When the PRV does not sufficiently reduce the pressure spike, the HPRV will then open to further limit the pressure spike.

Figure 1:
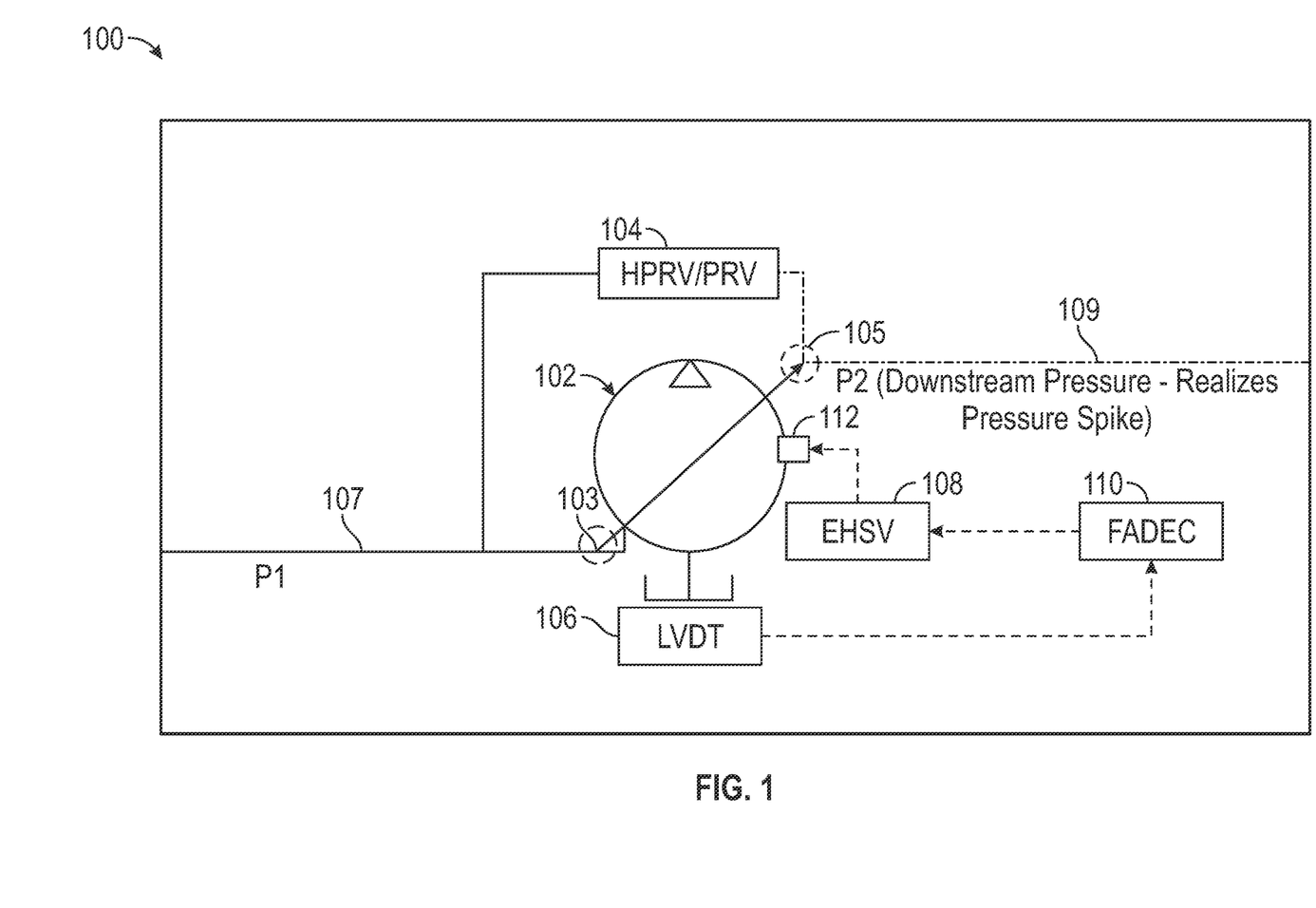
FIG. 1 is a schematic diagram of a direct control variable displacement pump (VDP) having dual-function high-pressure relief valve (HPRV)-pressure regulating valve (PRV) included in an aircraft fuel system according to a non-limiting embodiment of the present disclosure.

Turning now to FIG. 1, a pump control system 100 is illustrated according to a non-limiting embodiment. The pump control system 100 includes a direct control variable displacement pump (VDP) 102 having a dual-function high-pressure relief valve (HPRV)-pressure regulating valve (PRV) 104, a position sensor 106, an electro-hydraulic servo valve 108, and a controller 110 such as, for example, a Full Authority Digital Engine Controller (FADEC).

The direct control variable displacement pump (VDP) 102 includes a fluid inlet 103 and a fluid outlet 105. The fluid inlet is in fluid communication with an upstream fluid source (not shown) that provides upstream fluid 107 having a first pressure (P1). The fluid outlet 105 outputs downstream fluid 109 to one or more downstream devices or systems (not shown). The downstream devices or systems include, for example, hydraulic circuits, actuators, aircraft engines, etc.

The VDP 102 includes a hydraulic actuator 112 to control the displacement of the VDP 102 to provide a desired fuel flow rate in response to a load demand, e.g., a downstream device demand or downstream system demand, received by the controller 110. The hydraulic actuator 112 can receive hydraulic pressure to change the displacement and output of the VDP 102. According to a non-limiting embodiment, the hydraulic actuator 112 can be actuated by fluid pressure such as, for example, fuel pressure. For example, the fuel pressure can provided by the VDP 102.

Hydraulic pressure to the hydraulic actuator 112 is selectively provided by the EHSV 108. The EHSV 108 is implemented as an electrically operated valve that controls the pressure and flow of hydraulic fluid that is provided to the hydraulic actuator 112. The EHSV 108 can provide control of the hydraulic pressure applied to the hydraulic actuator 112 and therefore the displacement of the VDP 102. Operation of the EHSV 108 can be controlled by the controller 110 in response to the downstream demand and the position of the hydraulic actuator 112.

The position sensor 106 can measure the position of the VDP 102, and output a position signal to the controller 110 indicating the measured position. In one or more non-limiting embodiments, the position sensor 106 can be implemented as a linear-variable displacement transducer 106. The controller 110 can determine the position of the VDP 102 based on the position signal and control the EHSV 112 (e.g., control the hydraulic pressure provided by EHSV 112) to enable and establish a closed loop control of the output of the VDP 102.

The dual-function HPRV-PRV 104 is a single valve that can be connected in parallel with the VDP 102. The dual-function HPRV-PRV 104 dynamically operates in a first mode (e.g., a PRV mode) and a second mode (e.g., a HPRV mode) to provide both PRV and HPRV functionality. According to a non-limiting embodiment, the HPRV-PRV 104 operates to maintain a continuous small amount of bypass flow during steady-state (SS) operation and then operates to close off the bypass loop to dampen the initial pressure droop at the start of an actuation transient. As the transient ends, the PRV mode opens a bypass flow path to reduce a pressure spike occurring in the downstream fluid 109. When the PRV mode does not sufficiently reduce the pressure spike, the HPRV-PRV 104 transitions into the HPRV mode to open a front entry relief flow path, which further reduces and dampens the pressure spike.

Figure 2:
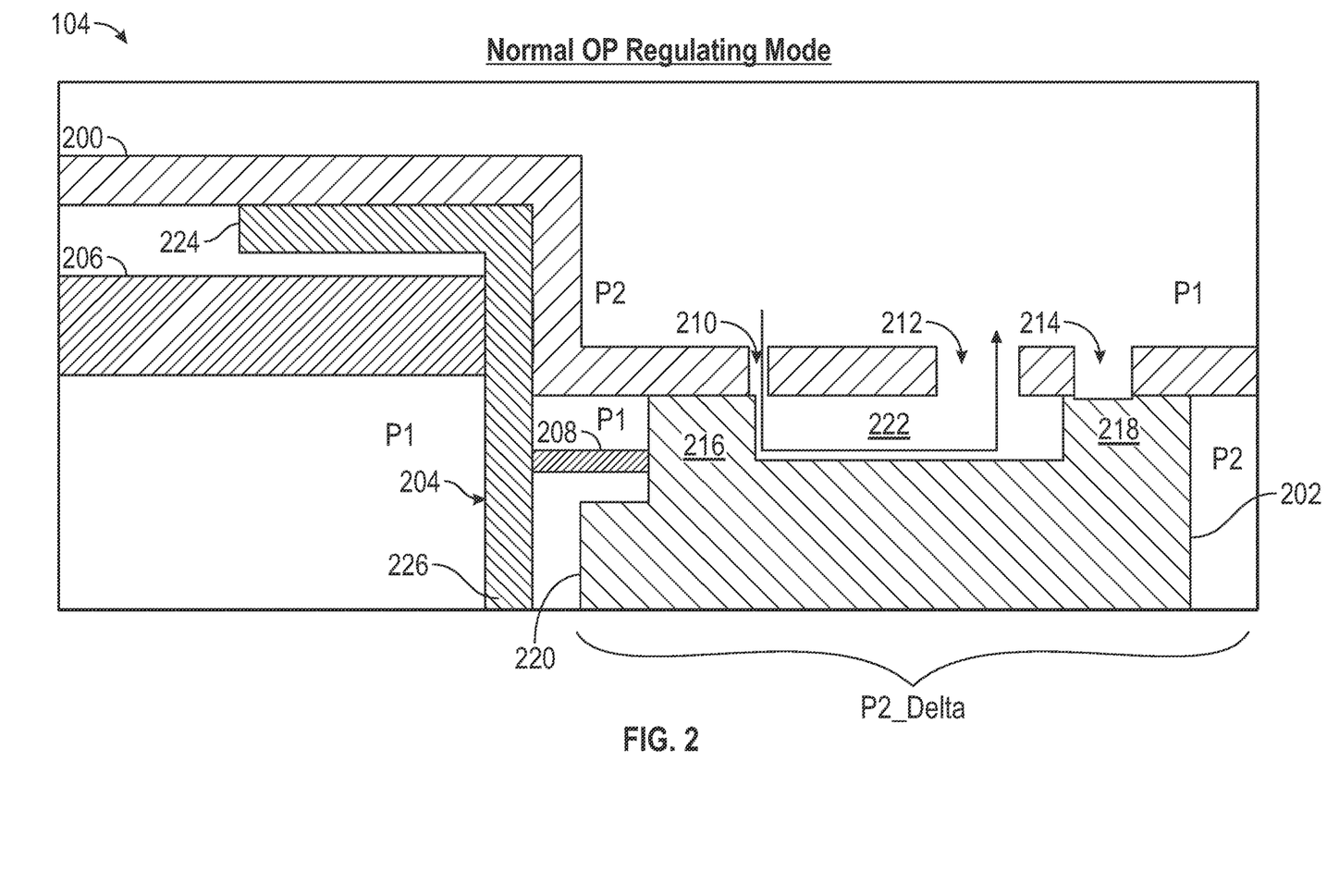
FIG. 2 is a diagram illustrating a VDP having dual-function HPRV-PRV operating in a normal regulating mode according to a non-limiting embodiment of the present disclosure.

With reference now to FIGS. 2-5, operation of the dual-function HPRV-PRV 104 is described according to non-limiting embodiments of the present disclosure. Turning to FIG. 2, the dual-function HPRV-PRV 104 is illustrated according to a non-limiting embodiment of the present disclosure. The dual-function HPRV-PRV 104 includes a housing that contains a valve sleeve 200, a PRV spool 202, an HPRV piston 204, a HPRV spring 206, and a PRV spring 208.

The valve sleeve 200 is fixed in place and includes a PRV inlet window 210, a PRV outlet window 212, and a pressure relief outlet window 214. The PRV spool 202 includes a PRV inlet landing 216, a combined PRV outlet landing and HPRV (PRV/HPRV) landing 218, and an HPRV bumper 220. The PRV inlet landing 216 and the combined PRV outlet landing and HPRV landing (PRV/HPRV) 218 are disposed within an internal area of the valve sleeve 200 having an inner diameter. The void between the PRV inlet landing 216 and combined PRV outlet landing and HPRV landing 218 defines a chamber 222 configured to convey fuel flow therethrough. The size of the PRV inlet window 210, the PRV outlet window 212, the HPRV outlet window 214, and/or the chamber 222 can vary based on the targeted amount of fuel intended to flow.

The HPRV piston 204 is disposed against the Valve sleeve 200 and is configured to slide laterally in a first direction and an opposing second direction (e.g., back and forth (with respect thereto. The HPRV piston 204 includes a HPRV outer diameter surface 224 and a HPRV stop surface 226. The HPRV outer diameter surface 224 is slidably disposed against the inner diameter surface of the valve sleeve 200. The HPRV stop surface 226 extends from the HPRV outer diameter surface 224 (e.g., orthogonally therefrom). A first side of the HPRV stop surface 226 is coupled to the HPRV spring 206, while an opposing second side of the HPRV stop surface 226 is coupled to the PRV spring 208. According to a non-limiting embodiment, the HPRV spring 206 is sized larger than PRV spring 208. In this manner, the HPRV spring 206 can exert a larger resistive spring force (e.g., during steady state conditions) on the HPRV stop surface 226 compared to the PRV spring 208.

The pressure difference ($\Delta P2$) between the downstream pressure (P2) and the upstream pressure (P1) controls lateral positions of the HPRV piston 204 and/or the PRV spool 202. In this manner, the positions of the PRV inlet landing 216, the combined PRV outlet landing and HPRV landing 218 and the chamber 222 can be dynamically adjusted with respect to the PRV inlet window 210, the PRV outlet window 212 and the HPRV outlet window 214, thereby effecting the different operating modes of the dual-function HPRV-PRV 104.

With continued reference to FIG. 2, the dual-function HPRV-PRV 104 is illustrated operating in a normal PRV operating mode. When in the normal PRV operating mode, the PRV spool 202 is positioned such that the PRV inlet window 210 and the PRV outlet window 212 are open, while the combined PRV outlet landing and HPRV landing (PRV/HPRV) 218 completely covers (i.e., closes) the HPRV outlet window 214. Accordingly, the PRV spool 202 enables and establishes a first bypass flow path from the downstream pressure side (P2) through into the chamber 222, and exiting through the upstream pressure side (P1), while preventing fuel flow through the HPRV outlet window 214.

Figure 3:
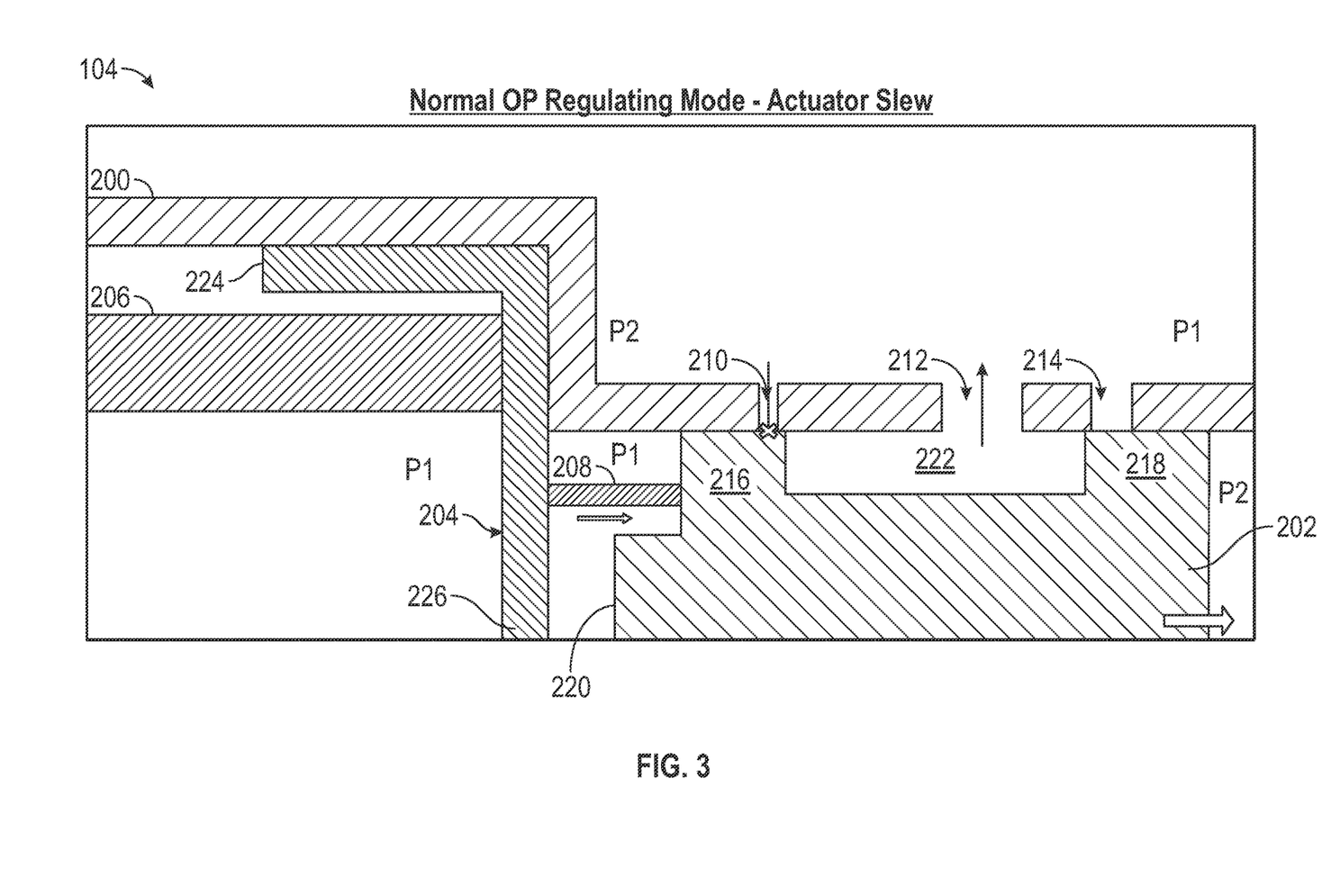
FIG. 3 is a diagram of the VDP having dual-function HPRV-PRV shown in FIG. 2 operating in a normal regulating mode during an actuator slew transient according to a non-limiting embodiment of the present disclosure.

Turning to FIG. 3, the dual-function HPRV-PRV 104 is illustrated operating in the normal PRV operating mode, but with a spool slew caused by a momentarily decrease in the downstream pressure (P2). When this event occurs, the PRV spring 208 expands and forces the PRV spool 202 to slide in the direction of the decreased downstream pressure (P2). As a result, the PRV inlet landing 216 may cover (i.e., close) the PRV inlet window 210. In one or more non-limiting embodiments, reducing and/or closing the opening of PRV inlet window 210 reduces and/or stops the bypass flow from the PRV inlet window 210 to the PRV outlet window 212 and helps the VDP 102 respond to an increased demand flow.

Figure 4:
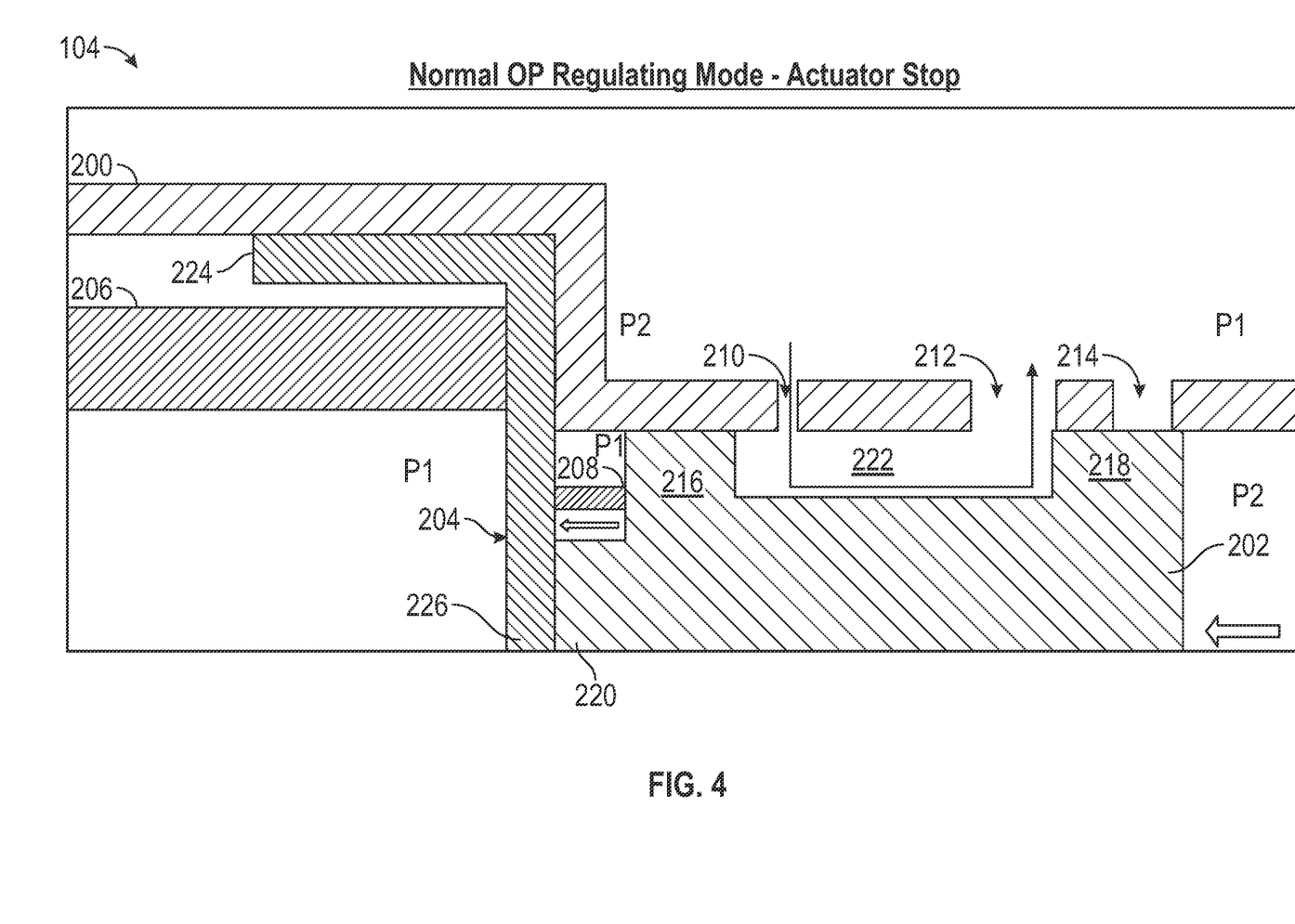
FIG. 4 is a diagram of the VDP having dual-function HPRV-PRV shown in FIG. 2 operating in a normal regulating mode during an actuator stop transient according to a non-limiting embodiment of the present disclosure.

Referring to FIG. 4, the dual-function HPRV-PRV 104 is illustrated operating in the normal PRV operating mode, but with the HPRV bumper 220 forced against the HPRV stop surface 226 due to the increase in the downstream pressure (P2). When this event occurs, the PRV spring 208 is compressed and the downstream pressure (P2) forces the PRV spool 202 to slide toward the HPRV piston 204 such that the HPRV bumper 220 is pressed against the HPRV stop surface 226. As a result, the PRV inlet window 210 is transitioned from partially open to fully open and provides a less restrictive flow path from window 210 to window 212 and assists in reducing a pressure spike.

Figure 5:
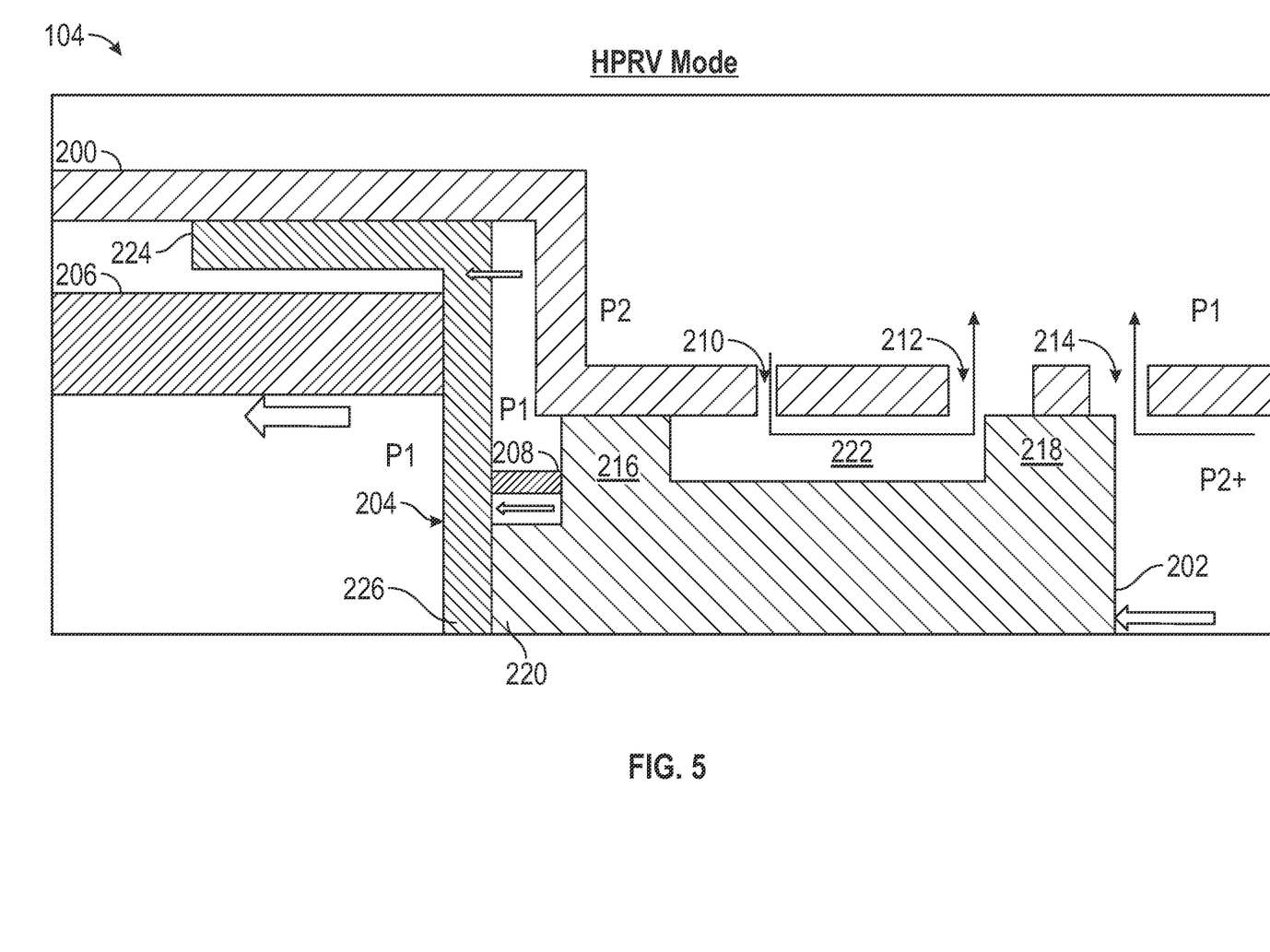
FIG. 5 is a diagram of the VDP having dual-function HPRV-PRV shown in FIG. 2 operating in a HPRV mode according to a non-limiting embodiment of the present disclosure.

Turning now to FIG. 5, the dual-function HPRV-PRV 104 is illustrated operating in an HPRV operating mode. The HPRV operating mode is invoked when the downstream pressure (P2+) continues to increase (e.g., due to a pressure transient in the downstream pressure side, P2+) and overtakes the resistance force exerted by the HPRV spring 206. As a result, the PRV spool 202 is further moved and pressed against the HPRV stop surface 226 to force the HPRV piston 204 apart from the sleeve 200 and compress the HPRV spring 206. Accordingly, the PRV inlet window 210, the PRV outlet window 212 and HPRV outlet window 214 are all opened to enable and establish the first bypass flow path, along with a front entry "relief" flow path. That is, the first bypass flow path and the front entry "relief" flow path are enabled and established simultaneously. The front entry "relief" flow path extends from the downstream pressure side experiencing the increased pressure (P2+), through the HPRV outlet window 214, and into the upstream pressure side (P1). In this manner, the HPRV operating mode further reduces and dampens a pressure transient occurring in the downstream pressure side (P2).

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pump control system comprising:
   a direct control variable displacement pump (VDP) including a fluid inlet configured to receive an upstream fluid having a first pressure (P1) and a fluid outlet configured to output a downstream fluid having a second pressure (P2);
   a dual-function high-pressure relief valve (HPRV)-pressure regulating valve (PRV) connected in parallel with the direct control VDP, the dual-function HPRV-PRV disposed in fluid communication between fluid inlet and the downstream fluid,
   wherein the HPRV-PRV is adjustable in a first direction and an opposing second direction when operating in a first mode to maintain an open bypass flow path while closing a front entry relief flow path, and is adjustable in the first direction to maintain the open bypass flow path and to open the front entry relief flow path in response to operating in a second mode.

2. The pump control system of claim 1, wherein the dual-function HPRV-PRV comprises:
   a valve sleeve including a PRV inlet window, a PRV outlet window, and a pressure relief outlet window;
   a PRV spool configured to slide laterally in a first direction and an opposing second direction with respect to the valve sleeve when operating in the first mode, the PRV spool including a PRV inlet landing, a combined PRV outlet landing and HPRV (PRV/HPRV) landing, and a chamber between the PRV inlet landing and the PRV/HPRV landing; and
   an HPRV piston disposed against the valve sleeve and configured to slide laterally in the first direction based at least in part on a pressing force applied by the PRV spool in response to operating in the second mode.

3. The pump control system of claim 2, wherein the dual-function HPRV-PRV operates in the first mode to adjust the PRV spool to maintain opening of the PRV inlet window and the PRV outlet window while closing the pressure relief outlet window to enable the bypass flow path, and operates in the second mode to adjust both the PRV spool and the HPRV piston to open each of the PRV inlet window, the PRV outlet window, and the pressure relief outlet window to enable the front entry relieve flow path.

4. The pump control system of claim 3, wherein the HPRV piston includes:
   an HPRV outer diameter surface slidably disposed against an inner diameter surface of the valve sleeve; and
   an HPRV stop surface extending orthogonally from the HPRV outer diameter surface.

5. The pump control system of claim 4, wherein the inlet landing and the PRV/HPRV landing are disposed within an inner area of the valve, and the PRV spool further includes a bumper extending therefrom and configured to apply the pressing force to the HPRV stop surface to laterally displace the HPRV piston.

6. The pump control system of claim 5, wherein, further comprising:
   an HPRV spring having a first end coupled to the housing and an opposing end coupled to a first side of the HPRV stop surface; and
   a PRV spring having a first end coupled to a second side of the HPRV stop surface opposite the first side and a second end coupled to the PRV spool.

7. The pump control system of claim 6, wherein the HPRV spring is sized larger than the PRV spring such that the HPRV spring exerts a first spring force upon the HPRV piston that is greater than a second spring force exerted by the PRV spring.

8. The pump control system of claim 7, wherein HPRV piston is displaced in the first direction in response to the pressing force applied by the PRV spool being greater than the first spring force exerted by the HPRV spring.

9. The pump control system of claim 3, further comprising:
   a hydraulic actuator configured to control displacement of the VDP based on hydraulic pressure;
   an electro-hydraulic servo valve (EHSV) configured to provide the hydraulic pressure to the hydraulic actuator;
   a position sensor configured to measure a position of the VDP and to output a position signal indicating the position of the VDP; and
   a controller in signal communication with the position sensor and the EHSV, the controller configured to control the EHSV based at least in part on the measured position of the VDP.

10. The pump control system of claim 9, wherein the controller determines a load demand and controls the hydraulic actuator to adjust the VDP based at least in part on the load demand.

11. The pump control system of claim 10, wherein controlling the hydraulic actuator controls a hydraulic pressure provided to the VDP.

12. The pump control system of claim 11, wherein the EHSV controls the pressure and flow of hydraulic fluid provided to the hydraulic actuator based on a control signal output by the controller.

13. The pump control system of claim 12, wherein the position sensor includes a linear-variable displacement transducer.

14. A dual-function high-pressure relief valve (HPRV)-pressure regulating valve (PRV) comprising:
   a valve sleeve including a PRV inlet window, a PRV outlet window, and a pressure relief outlet window;
   a PRV spool configured to slide laterally in a first direction and an opposing second direction with respect to the valve sleeve, the PRV spool including a PRV inlet landing, a combined PRV outlet landing and HPRV (PRV/HPRV) landing, and a chamber between the PRV inlet landing and the PRV/HPRV landing; and
   an HPRV piston disposed against the valve sleeve and configured to slide laterally in the first direction and the opposing second direction based at least in part on a pressing force applied by the PRV spool,
   wherein the dual-function HPRV-PRV operates in a first mode to adjust the PRV spool to maintain opening of the PRV inlet window and the PRV outlet window while closing the pressure relief outlet window, and operates in the second mode to adjust both the PRV spool and the HPRV piston to open each of the PRV inlet window, the PRV outlet window, and the pressure relief outlet window.

15. The dual-function HPRV-PRV of claim 14, wherein:
the PRV spool is configured to slide in the first and second directions when operating in the first mode such that the PRV inlet window and the PRV outlet window enable a bypass flow path; and
the PRV spool is configured to slide in the first direction and displace the HPRV piston such that the bypass flow path is maintained, and the pressure relief outlet window is opened to enable a front entry relief flow path.

16. The dual-function HPRV-PRV of claim 15, wherein the HPRV piston includes:
an HPRV outer diameter surface slidably disposed against an inner diameter surface of the valve sleeve; and
an HPRV stop surface extending orthogonally from the HPRV outer diameter surface.

17. The dual-function HPRV-PRV of claim 16, wherein the inlet landing and the PRV/HPRV landing are disposed within an inner area of the valve, and the PRV spool further includes a bumper extending therefrom and configured to apply the pressing force to the HPRV stop surface to laterally displace the HPRV piston.

18. The dual-function HPRV-PRV of claim 17, further comprising:
an HPRV spring having a first end coupled to the housing and an opposing end coupled to a first side of the HPRV stop surface; and
a PRV spring having a first end coupled to a second side of the HPRV stop surface opposite the first side and a second end coupled to the PRV spool.

19. The dual-function HPRV-PRV of claim 18, wherein the HPRV spring is sized larger than PRV spring such that the HPRV spring exerts a first spring force upon the HPRV piston that is greater than a second spring force exerted by the PRV spring.

20. The dual-function HPRV-PRV of claim 19, wherein HPRV piston is displaced in the first direction in response to the pressing force applied by the PRV spool being greater than the first spring force exerted by the HPRV spring.

* * * * *